US012561708B2

(12) United States Patent
Gold et al.

(10) Patent No.: US 12,561,708 B2
(45) Date of Patent: *Feb. 24, 2026

(54) SYSTEMS AND METHODS FOR PREDICTING CHURN IN A MULTI-TENANT SYSTEM

(71) Applicant: Zuora, Inc., Redwood City, CA (US)

(72) Inventors: Carl Gold, Albany, CA (US); Dashiell Stander, San Rafael, CA (US); Kevin Suer, Alameda, CA (US)

(73) Assignee: Zuora, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/419,924

(22) Filed: Jan. 23, 2024

(65) Prior Publication Data

US 2024/0161138 A1     May 16, 2024

Related U.S. Application Data

(63) Continuation of application No. 18/089,125, filed on Dec. 27, 2022, now Pat. No. 11,880,851, which is a
(Continued)

(51) Int. Cl.
*G06Q 30/0202*     (2023.01)
*G06N 5/02*     (2023.01)
(Continued)

(52) U.S. Cl.
CPC ........... *G06Q 30/0202* (2013.01); *G06N 5/02* (2013.01); *G06N 20/00* (2019.01); *G06Q 10/06375* (2013.01)

(58) Field of Classification Search
None
See application file for complete search history.

(56) References Cited

U.S. PATENT DOCUMENTS 6,677,963 B1 * 1/2004 Mani ..................... H04M 15/58
                                                    707/999.005
8,265,992 B1 * 9/2012 Seshadri ................ G06Q 10/10
                                                    705/14.19
(Continued)

FOREIGN PATENT DOCUMENTS

EP            1811446 A1 * 7/2007 ............. G06Q 30/02
EP            3136332 A1 * 3/2017 ......... G06Q 30/0255
(Continued)

OTHER PUBLICATIONS

Qureshi, Saad Ahmed, et al. "Telecommunication subscribers' churn prediction model using machine learning." Eighth international conference on digital information management (ICDIM 2013). IEEE, 2013. (Year: 2013).*
(Continued)

*Primary Examiner* — Brian M Epstein
*Assistant Examiner* — Derick J Holzmacher
(74) *Attorney, Agent, or Firm* — Fish & Richardson P.C.

(57)                    ABSTRACT

Store a subscription dataset for each tenant of a multi-tenant system, each of the subscription datasets having a common data format native to the system, the subscription datasets including billing data and not behavioral data. Determine primary features from a particular subscription dataset. Derive secondary features from the primary features. Generate a churn prediction model based on the primary features and the secondary features. Obtain a second subscription dataset, the second subscription dataset comprising billing data that is more recent than the particular subscription dataset. Identify, using the particular churn prediction model and the second subscription dataset, one or more subscribers as a churn-risk. Report the one or more subscribers identified as a churn-risk.

20 Claims, 5 Drawing Sheets

Related U.S. Application Data continuation of application No. 16/431,508, filed on Jun. 4, 2019, now Pat. No. 11,538,049.

(60) Provisional application No. 62/680,568, filed on Jun. 4, 2018.

(51) Int. Cl.
| | | |
|---|---|---|
| *G06N 20/00* | (2019.01) | |
| *G06Q 10/0637* | (2023.01) | |

(56) References Cited

U.S. PATENT DOCUMENTS

| | | | |
|---|---|---|---|
| 8,311,967 | B1 * | 11/2012 | Lin .......................... G06N 5/04 |
| | | | 706/62 |
| 2003/0191677 | A1 | 10/2003 | Akkiraju et al. |
| 2003/0200135 | A1 * | 10/2003 | Wright ............... G06Q 30/0201 |
| | | | 705/7.29 |
| 2004/0034558 | A1 * | 2/2004 | Eskandari ............. G06Q 30/02 |
| | | | 705/7.29 |
| 2005/0267970 | A1 * | 12/2005 | Sugizaki ................ H04L 67/04 |
| | | | 709/225 |
| 2006/0235831 | A1 | 10/2006 | Adinolfi et al. |
| 2007/0156673 | A1 * | 7/2007 | Maga ............... G06Q 10/06375 |
| | | | 707/999.005 |
| 2007/0185867 | A1 * | 8/2007 | Maga ..................... G06Q 30/02 |
| 2009/0192809 | A1 * | 7/2009 | Chakraborty .......... G06Q 10/00 |
| | | | 705/348 |
| 2012/0053990 | A1 * | 3/2012 | Pereg ................. G06Q 30/0202 |
| | | | 705/7.31 |
| 2012/0130973 | A1 | 5/2012 | Tamm et al. |
| 2012/0155290 | A1 * | 6/2012 | Dantressangle .... H04L 41/5064 |
| | | | 370/250 |
| 2013/0054306 | A1 * | 2/2013 | Bhalla ................ G06Q 30/0201 |
| | | | 705/7.31 |
| 2013/0097204 | A1 | 4/2013 | Venkataraman et al. |
| 2013/0279672 | A1 * | 10/2013 | Mohan .................. H04M 15/47 |
| | | | 379/133 |
| 2014/0075239 | A1 | 3/2014 | Prathipati et al. |
| 2014/0119522 | A1 * | 5/2014 | Phadke ................. H04M 15/58 |
| | | | 379/133 |
| 2014/0122594 | A1 * | 5/2014 | Uzunalioglu ........... H04L 43/08 |
| | | | 709/204 |
| 2015/0030151 | A1 * | 1/2015 | Bellini ................. G06Q 10/063 |
| | | | 379/265.06 |
| 2015/0371163 | A1 * | 12/2015 | Noh ................... G06Q 10/0635 |
| | | | 705/7.28 |
| 2016/0155076 | A1 * | 6/2016 | Fix ................... G06Q 10/06395 |
| | | | 705/7.39 |
| 2016/0203509 | A1 * | 7/2016 | Sharp, III .......... G06Q 30/0244 |
| | | | 705/14.43 |
| 2016/0212222 | A1 * | 7/2016 | Bultema ................. H04L 67/34 |
| 2016/0308963 | A1 | 10/2016 | Kung |
| 2017/0017908 | A1 * | 1/2017 | Bracher ................. H04L 67/10 |
| 2017/0032408 | A1 * | 2/2017 | Kumar .............. G06Q 30/0244 |
| 2017/0060930 | A1 * | 3/2017 | Elkherj ................. G06F 16/248 |
| 2017/0116626 | A1 * | 4/2017 | Ramamoorthy ........ H04L 41/40 |
| 2017/0169345 | A1 * | 6/2017 | de Knijf ............... H04L 67/535 |
| 2017/0257285 | A1 * | 9/2017 | Scholz ............... H04L 41/5032 |
| 2018/0034921 | A1 * | 2/2018 | Gopalan ............... G06N 20/00 |
| 2018/0137526 | A1 * | 5/2018 | Haruta .................. G06Q 10/06 |
| 2018/0253637 | A1 * | 9/2018 | Zhu ....................... H04L 67/535 |
| 2018/0268258 | A1 * | 9/2018 | Tapia ........................ G06F 8/34 |
| 2019/0213511 | A1 * | 7/2019 | Higgins .............. G06Q 10/067 |
| 2019/0266622 | A1 * | 8/2019 | Turnbull .............. H04W 4/029 |

FOREIGN PATENT DOCUMENTS

| | | | | |
|---|---|---|---|---|
| WO | WO-2014126576 | A2 * | 8/2014 | .......... H04L 41/147 |
| WO | WO-2014127051 | A1 * | 8/2014 | .......... H04L 41/147 |

OTHER PUBLICATIONS

Vafeiadis, Thanasis, et al. "A comparison of machine learning techniques for customer churn prediction." Simulation Modelling Practice and Theory 55 (2015): 1-9. (Year: 2015).*

Gaur, Abhishek, and Ratnesh Dubey. "Predicting Customer Churn Prediction in Telecom Sector Using Various Machine Learning Techniques." 2018 International Conference on Advanced Computation and Telecommunication (ICACAT). IEEE, 2018. (Year: 2018).*

Gaur, Abhishek, et al., "Predicting Customer Churn Prediction in Telecom Sector Using Various Machine Learning Techniques", 2018 International Conference on Advanced Computation and Telecommunication (ICACAT), IEEE, 2018 (Year: 2018), 5 pages.

Qureshi, Saad Ahmed, et al. "Telecommunication Subscribers' Churn Prediction Model Using Machine Learning", Eighth International Conference on Digital Information Management (ICDIM 2013), IEEE, 2013 (Year: 2013), pp. 131-136.

Vafeiadis, Thanasis, et al. "A Comparison of Machine Learning Techniques for Customer Churn Prediction", Simulation Modelling Practice and Theory, vol. 55, 2015 (Year: 2015), pp. 1-9.

* cited by examiner

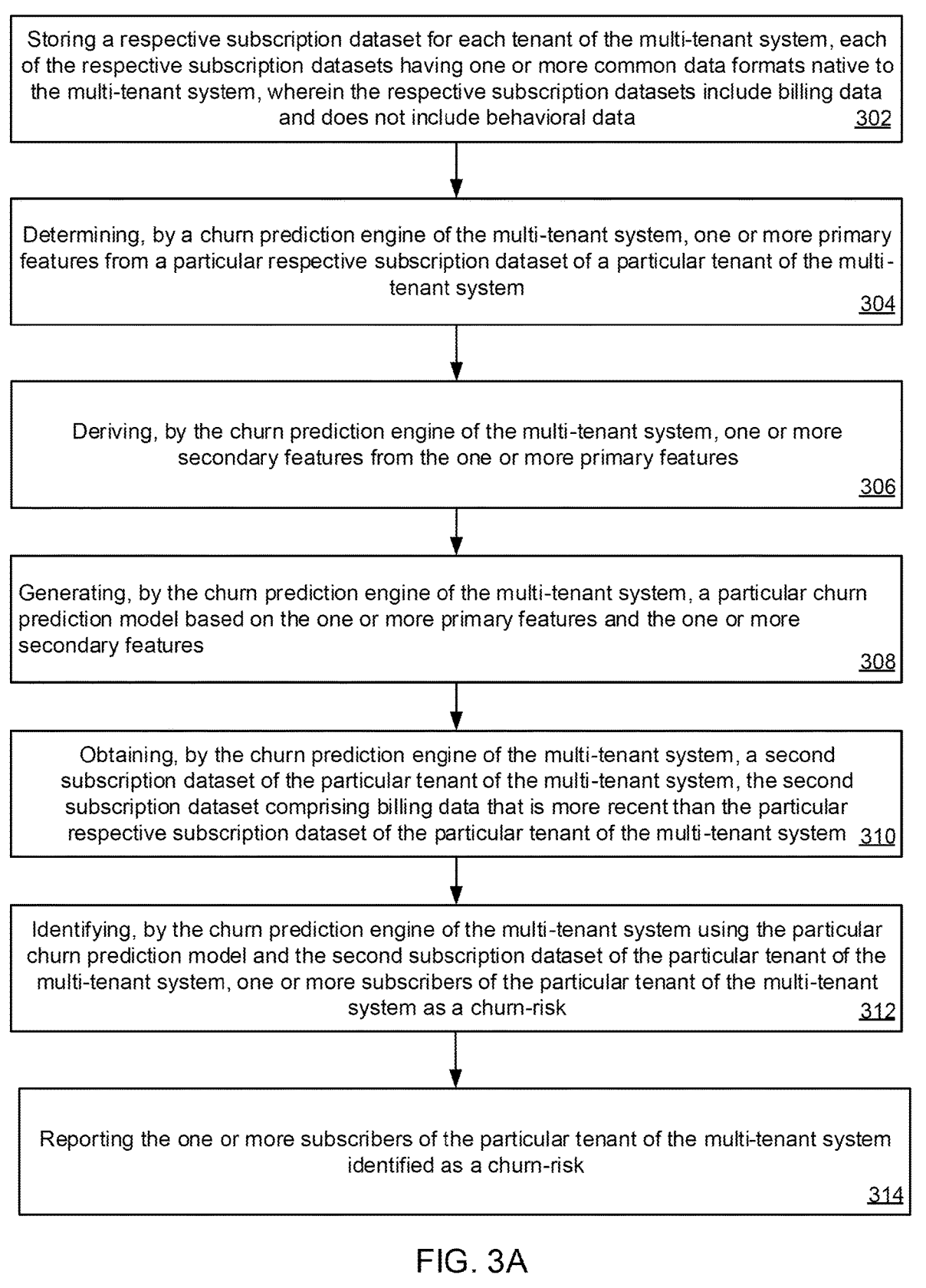

Storing a respective subscription dataset for each tenant of the multi-tenant system, each of the respective subscription datasets having one or more common data formats native to the multi-tenant system, wherein the respective subscription datasets include billing data and does not include behavioral data    302

Determining, by a churn prediction engine of the multi-tenant system, one or more primary features from a particular respective subscription dataset of a particular tenant of the multi-tenant system    304

Deriving, by the churn prediction engine of the multi-tenant system, one or more secondary features from the one or more primary features    306

Generating, by the churn prediction engine of the multi-tenant system, a particular churn prediction model based on the one or more primary features and the one or more secondary features    308

Obtaining, by the churn prediction engine of the multi-tenant system, a second subscription dataset of the particular tenant of the multi-tenant system, the second subscription dataset comprising billing data that is more recent than the particular respective subscription dataset of the particular tenant of the multi-tenant system    310

Identifying, by the churn prediction engine of the multi-tenant system using the particular churn prediction model and the second subscription dataset of the particular tenant of the multi-tenant system, one or more subscribers of the particular tenant of the multi-tenant system as a churn-risk    312

Reporting the one or more subscribers of the particular tenant of the multi-tenant system identified as a churn-risk    314

FIG. 3A

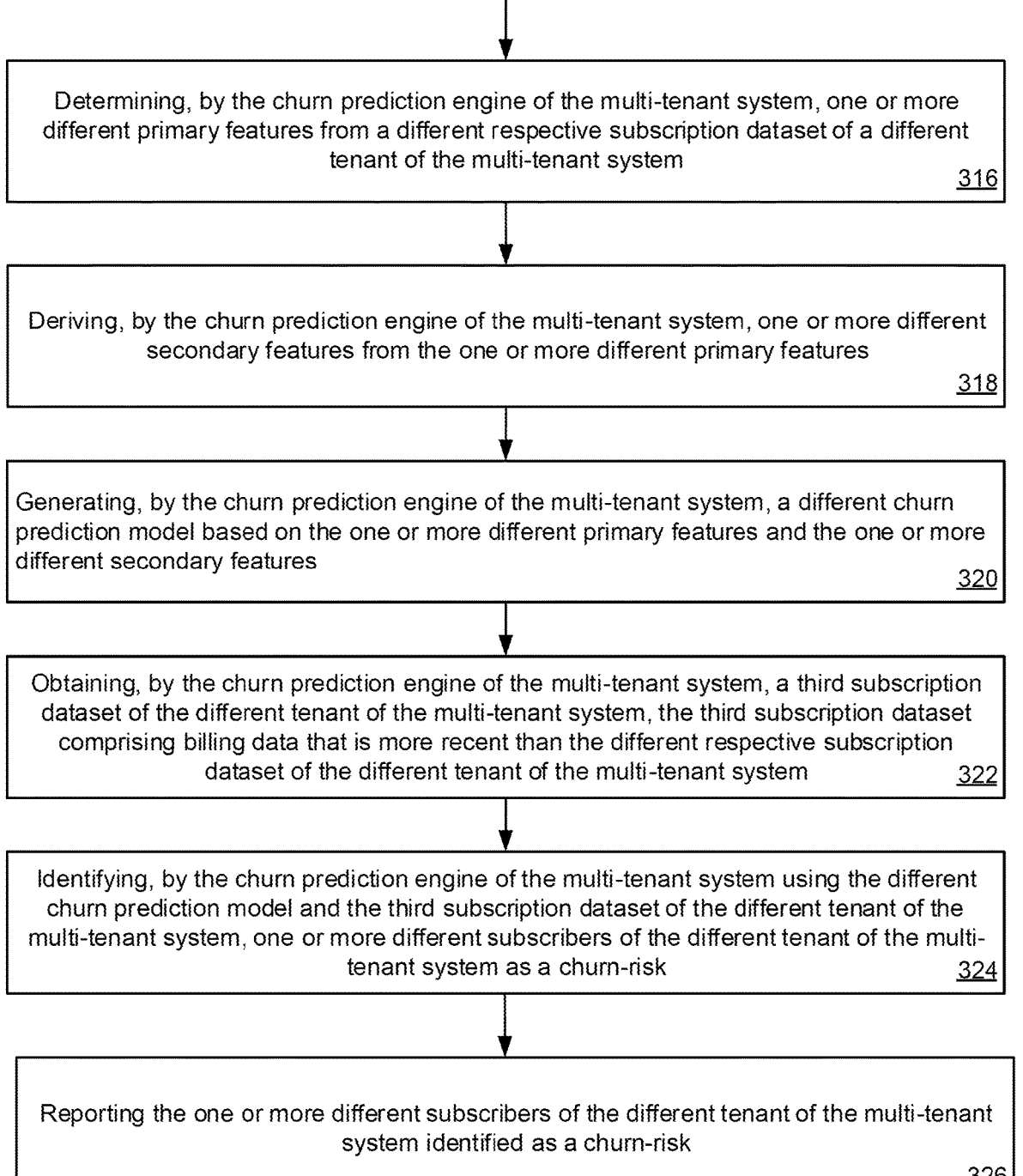

Determining, by the churn prediction engine of the multi-tenant system, one or more different primary features from a different respective subscription dataset of a different tenant of the multi-tenant system
316

Deriving, by the churn prediction engine of the multi-tenant system, one or more different secondary features from the one or more different primary features
318

Generating, by the churn prediction engine of the multi-tenant system, a different churn prediction model based on the one or more different primary features and the one or more different secondary features
320

Obtaining, by the churn prediction engine of the multi-tenant system, a third subscription dataset of the different tenant of the multi-tenant system, the third subscription dataset comprising billing data that is more recent than the different respective subscription dataset of the different tenant of the multi-tenant system     322

Identifying, by the churn prediction engine of the multi-tenant system using the different churn prediction model and the third subscription dataset of the different tenant of the multi-tenant system, one or more different subscribers of the different tenant of the multi-tenant system as a churn-risk     324

Reporting the one or more different subscribers of the different tenant of the multi-tenant system identified as a churn-risk
326

FIG. 3B

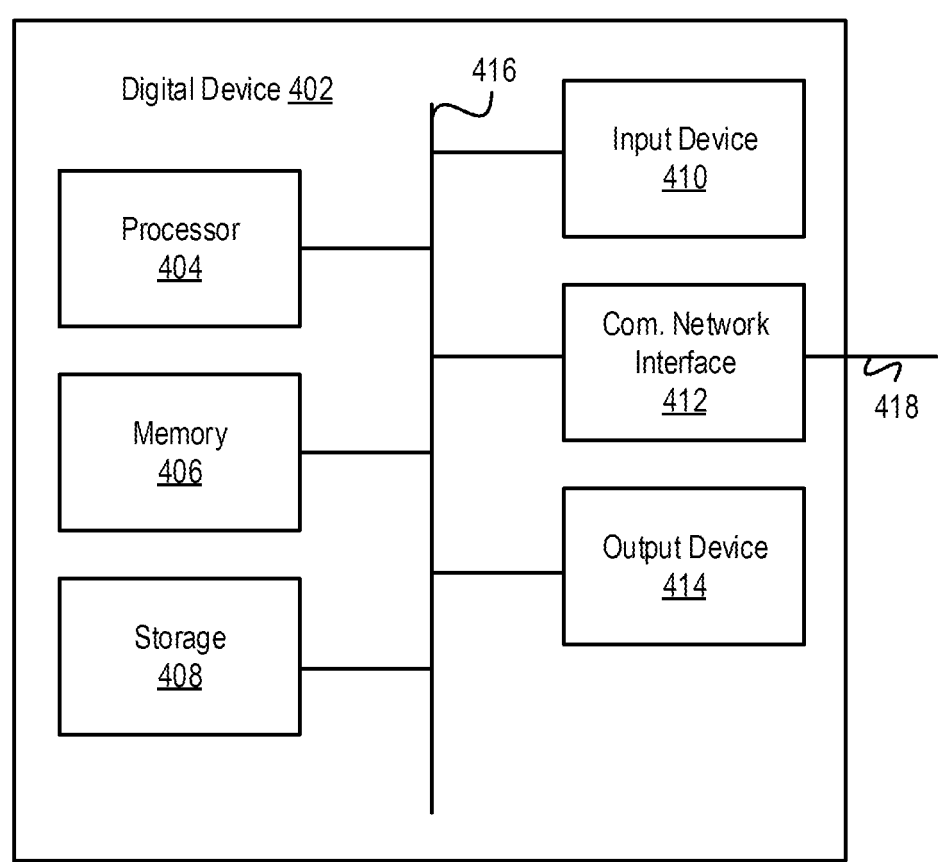
FIG. 4

SYSTEMS AND METHODS FOR PREDICTING CHURN IN A MULTI-TENANT SYSTEM

CROSS-REFERENCE TO RELATED APPLICATIONS

This application is a continuation of U.S. application Ser. No. 18/089,125, filed Dec. 27, 2022, and entitled "Systems and Methods for Predicting Churn in a Multi-Tenant System," which is a continuation of U.S. application Ser. No. 16/432,508, filed Jun. 4, 2019, and entitled "Systems and Methods for Predicting Churn in a Multi-Tenant System," now U.S. Pat. No. 11,538,049, which claims the benefit of U.S. Provisional Patent Application Ser. 62/680,568, filed Jun. 4, 2018, and entitled "System and Method for Predicting Churn in a Multi-Tenant System," which are hereby incorporated by reference herein.

TECHNICAL FIELD

This disclosure pertains to multi-tenant computing systems. More specifically, this disclosure pertains to predicting churn in a multi-tenant computing system.

BACKGROUND

Under conventional approaches, predicting churn (that is, predicting the likelihood a customer may cancel a service) may be determined by reviewing behavioral data. For example, predicting churn analysis may be determined by reviewing how often a user accesses the service. Typically, behavioral data is managed by service provider systems and stored in service-provider-managed data warehouse systems that cannot be easily accessed by external systems. Accordingly, predicting churn in traditional systems would be computationally intensive in terms of computer resources (e.g., memory, bandwidth, processing speeds, and/or the like) and/or processing time.

SUMMARY

A claimed solution rooted in computer technology overcomes problems specifically arising in the realm of computer technology. In various embodiments, a computing system is configured to predict churn in a multi-tenant system without using behavioral data. This may, for example, reduce computing resource requirements and/or reduce the amount of processing time to predict churn in a multi-tenant system. For example, the multi-tenant system may store billing data in a data format (or, data formats) that is native to the multi-tenant system, and that data format may be common across all of the tenants of the multi-tenant system. The multi-tenant system may generate churn prediction models for each of the tenants using their respective billing data. For example, historical billing data for AT&T may be used to generate a churn prediction model for AT&T, and historical billing data for Verizon may be used to generate a churn prediction model for Verizon. Since the billing data is local to the multi-tenant system, and in a native format, the multi-tenant system does not need to obtain data in non-native formats from third-party systems, and/or integrate such data into a data format of the multi-tenant system. The multi-tenant system may use the respective churn prediction models to predict churn using current billing data. For example, the multi-tenant system may identify current AT&T subscribers that are considered a churn-risk (e.g., at risk of canceling their AT&T subscription) using the AT&T churn prediction model and the current AT&T billing data, and identify current Verizon subscribers that are considered a churn-risk using the Verizon churn prediction model and the current Verizon billing data. Since the data formats are native to the multi-tenant system and common across the tenants, the multi-tenant system may predict churn for any number of tenants of the multi-tenant system without having to integrate large amounts of external data (e.g., behavioral data). Additionally, billing datasets are typically much smaller than behavioral datasets, which may reduce the computing requirements (e.g., memory requirements, processor requirements) required to predict churn in a multi-tenant system. Furthermore, because the data is in the single native format of the multi-tenant system it is feasible to handle data errors using automated programs rather than interventions by system administrators.

Various embodiments of the present disclosure include systems, methods, and non-transitory computer readable media configured to store a respective subscription dataset for each tenant of the multi-tenant system, each of the respective subscription datasets having one or more common data formats native to the multi-tenant system, wherein the respective subscription datasets include billing data and does not include behavioral data. Determine, by a churn prediction engine of the multi-tenant system, one or more primary features from a particular respective subscription dataset of a particular tenant of the multi-tenant system. Derive, by the churn prediction engine of the multi-tenant system, one or more secondary features from the one or more primary features. Generate, by the churn prediction engine of the multi-tenant system, a particular churn prediction model based on the one or more primary features and the one or more secondary features. Obtain, by the churn prediction engine of the multi-tenant system, a second subscription dataset of the particular tenant of the multi-tenant system, the second subscription dataset comprising billing data that is more recent than the particular respective subscription dataset of the particular tenant of the multi-tenant system. Identify, by the churn prediction engine of the multi-tenant system using the particular churn prediction model and the second subscription dataset of the particular tenant of the multi-tenant system, one or more subscribers of the particular tenant of the multi-tenant system as a churn-risk. Report the one or more subscribers of the particular tenant of the multi-tenant system identified as a churn-risk.

In some embodiments, the systems, methods, and non-transitory computer readable media further configured to perform: generating, by the churn prediction engine of the multi-tenant system, a different churn prediction model based on the one or more different primary features and the one or more different secondary features; obtaining, by the churn prediction engine of the multi-tenant system, a third subscription dataset of the different tenant of the multi-tenant system, the third subscription dataset comprising billing data that is more recent than the different respective subscription dataset of the different tenant of the multi-tenant system; identifying, by the churn prediction engine of the multi-tenant system using the different churn prediction model and the third subscription dataset of the different tenant of the multi-tenant system, one or more different subscribers of the different tenant of the multi-tenant system as a churn-risk; and reporting the one or more different subscribers of the different tenant of the multi-tenant system identified as a churn-risk.

In some embodiments, the one or more common data formats native to the multi-tenant system are independent of third-party data formats, and are not based on an integration of third-party data.

In some embodiments, the churn prediction engine is configured to operate on the one or more common data formats native to the multi-tenant system, thereby allowing the churn prediction engine to use the same machine learning algorithm for the particular churn prediction model and the different churn prediction model.

In some embodiments, the machine learning algorithm comprises a regression analysis.

In some embodiments, the one or more primary features include date of last payment and subscription status.

In some embodiments, the one or more second features include length of time since the date of last payment.

In some embodiments, the one or more second features include any of measures and statistics of plan information keywords.

In some embodiments, the one or more second features include any of measures and statistics of subscription billing amounts.

In some embodiments, the one or more second features include any of measures and statistics of subscription history.

In some embodiments, the one or more second features include any of features derived from the use by subscribers of products from different tenants on the multi-tenants system.

In some embodiments, the particular respective subscription dataset of the particular tenant of the multi-tenant system includes a limited number of examples of churn.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

FIGS. 3A-B depict a flowchart of an example of a method of predicting churn in a multi-tenant system according to some embodiments.

FIG. 4 is a diagram of an example computer system for implementing the features disclosed herein according to some embodiments.

DETAILED DESCRIPTION

A claimed solution rooted in computer technology overcomes problems specifically arising in the realm of computer technology. In various embodiments, a computing system is configured to predict churn in a multi-tenant system without using behavioral data. This may, for example, reduce computing resource requirements and/or reduce the amount of processing time to predict churn in a multi-tenant system. For example, the multi-tenant system may store billing data in a data format (or, data formats) that is native to the multi-tenant system, and that data format may be common across all of the tenants of the multi-tenant system. The multi-tenant system may generate churn prediction models for each of the tenants using their respective billing data. For example, historical billing data for AT&T may be used to generate a churn prediction model for AT&T, and historical billing data for Verizon may be used to generate a churn prediction model for Verizon. Since the billing data is local to the multi-tenant system, and in a native format, the multi-tenant system does not need to obtain data in non-native formats from third-party systems, and/or integrate such data into a data format of the multi-tenant system. The multi-tenant system may use the respective churn prediction models to predict churn using current billing data. For example, the multi-tenant system may identify current AT&T subscribers that are considered a churn-risk (e.g., at risk of canceling their AT&T subscription) using the AT&T churn prediction model and the current AT&T billing data, and identify current Verizon subscribers that are considered a churn-risk using the Verizon churn prediction model and the current Verizon billing data. Since the data formats are native to the multi-tenant system and common across the tenants, the multi-tenant system may predict churn for any number of tenants of the multi-tenant system without having to integrate large amounts of external data (e.g., behavioral data). Additionally, billing datasets are typically much smaller than behavioral datasets, which may reduce the computing requirements (e.g., memory requirements, processor requirements) required to predict churn in a multi-tenant system. Furthermore, because the data is in the single native format of the multi-tenant system it is feasible to handle data errors using automated programs rather than interventions by system administrators.

Figure 1:
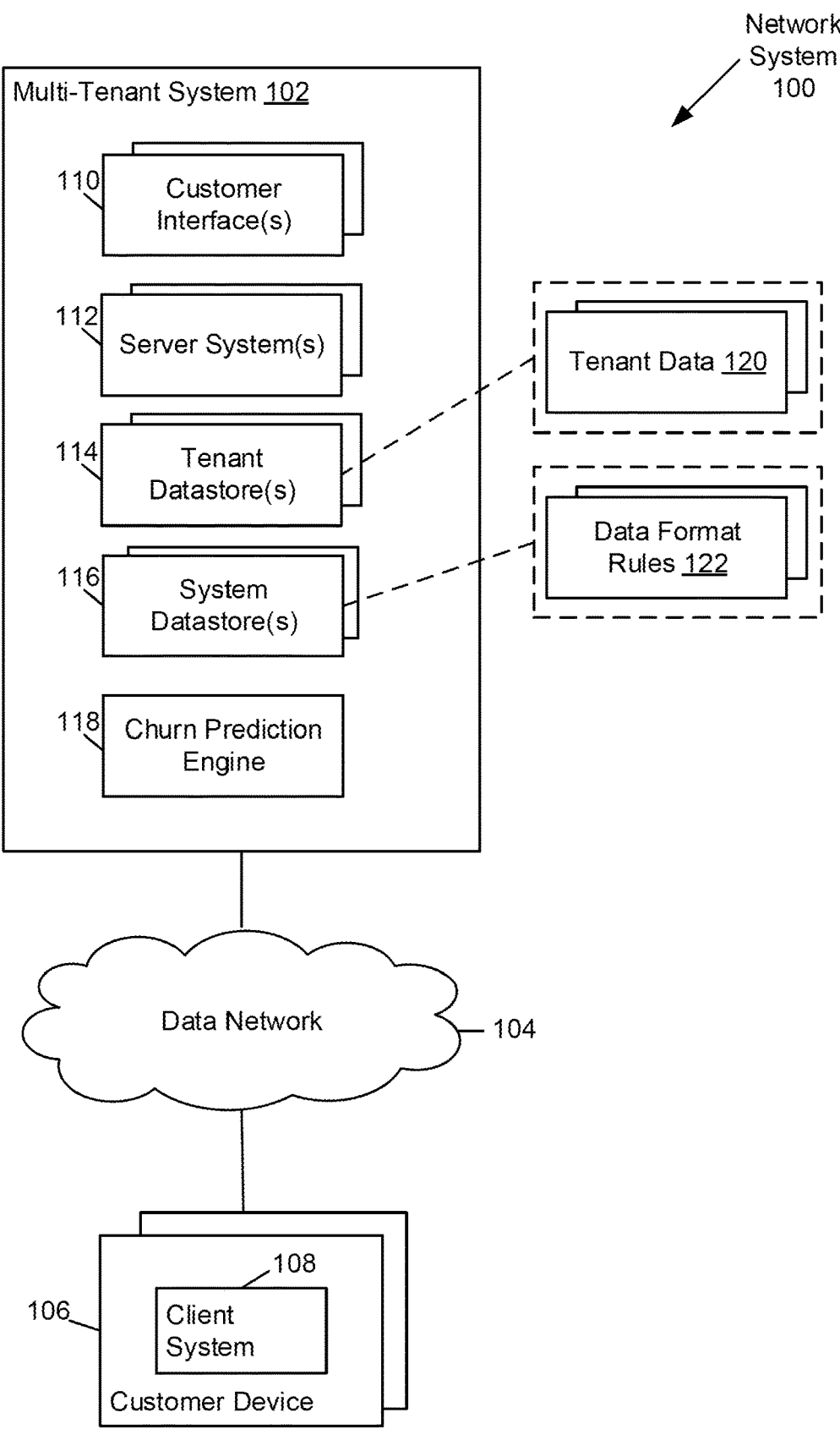
FIG. 1 depicts a diagram of an example network system for predicting churn in a multi-tenant system according to some embodiments.

FIG. 1 depicts a diagram of an example network system 100 for predicting churn in a multi-tenant system 102 according to some embodiments. In the example of FIG. 1, the network system 100 provides cloud-based software-as-a-service (SAAS) services of a multi-tenant system 102 to multiple tenants. Examples of the cloud-based SAAS services include data storage, data processing, and business-oriented applications. In some embodiments, each tenant may be a subscription-based entity or provider (e.g., an internet service provider, a home security system and service provider, a cellular phone service provider, or entertainment content provider). Each tenant may include a group of one or more users (e.g., individuals, business entities, customers of the business entities, systems) who share access to the cloud-based services. In one embodiment, a tenant includes a service entity such as AT&T, Netflix, Verizon, and/or the like. A tenant may include one or more products or services of an entity. For example, AT&T internet products may be a particular tenant, and AT&T security products may be another tenant. In some embodiments, the cloud-based SAAS services relate to managing subscriber records, product and/or service consumption information, billing information, payment information, and/or the like.

The network system 100 includes the multi-tenant system 102 coupled via a data network 104 (e.g., a set of one or more public and/or private, wired and/or wireless networks) to client devices 106. The multi-tenant system 102 includes shared resources to host the cloud-based SAAS services to the tenants. The shared resources may include processors, memory, virtual systems, services, application programs, load balancers, firewalls, and/or the like. As shown, the multi-tenant system 102 includes tenant interfaces 110, server systems 112, tenant datastores 114, server system datastores 116, and a churn prediction engine 118. Each of the client devices 106 includes a client system 108 that accesses the cloud-based SAAS services hosted by the multi-tenant system 102. In some embodiments, the client systems 108 may be operated by employees (e.g., administrator users) of the provider of the provider of the multi-tenant system 102. In some embodiments, the client systems 108 may be operated by employees of the tenant. In some embodiments, the client systems 108 may be operated by end users of the tenant's services.

Each client device 106 may include a desktop, laptop, notebook, tablet, personal digital assistant, smart phone, or other consumer electronic devices incorporating one or more computer components. The client system 108 on each client device 106 may include hardware, software and/or firmware for communicating with the multi-tenant system 102 and accessing the cloud-based services it hosts. Examples of the client systems 108 may include web browsers, client engines, drivers, user interface components, proprietary interfaces, and/or the like.

The multi-tenant system 102 includes hardware, software and/or firmware to host the cloud-based services for the tenants. It will be appreciated that the typical multi-tenant system 102 may offer access to shared resources including systems and applications on shared devices and offer each tenant the same quality or varying qualities of service. In some embodiments, the multi-tenant system 102 does not use virtualization or instantiation processes. In some embodiments, a multi-tenant system 102 integrates several business computing systems into a common system with a view toward streamlining business processes and increasing efficiencies on a business-wide level.

In some embodiments, the multi-tenant system 102 includes a user interface tier of multiple tenant interfaces 110, a server tier of multiple server systems 112, a datastore tier of multiple tenant datastores 114 for the multiple tenants, one or more system datastores 116, and a churn prediction engine 118. In some embodiments, the tenant interfaces 110 includes graphical user interfaces and/or web-based interfaces to enable tenants to access the shared services hosted by the multi-tenant system 102. The tenant interfaces 110 may support load balancing when multiple tenants (and/or multiple customers of the tenants) try to access the multi-tenant system 102 concurrently. The tenant interfaces 110 may additionally or alternatively include an operator interface for use by a systems operator to configure or otherwise manage the multi-tenant system 102. In some embodiments, each tenant may be associated with a subset of the total tenant interfaces 118 for load balancing.

In some embodiments, the server systems 112 include hardware, software and/or firmware to host the shared services for tenants. The hosted services may include tenant-specific business services or functions, including enterprise resource planning (ERP), customer relationship management (CRM), eCommerce, Human Resources (HR) management, payroll, financials, accounting, calendaring, order processing, subscription billing, inventory management, supply chain management (SCM), collaboration, sales force automation (SFA), marketing automation, contact list management, call-center support, web-based customer support, partner and vendor management systems, product lifecycle management (PLM), financial, reporting and analysis, and/ or the like. Similar to the tenant interfaces 110, in some embodiments, the server systems 110 may support load balancing when multiple tenants (and/or multiple customers of tenants) try to access the multi-tenant system 102 concurrently. Further, in some embodiments, each tenant may be associated with a subset of the total server systems 112 for load balancing.

In some embodiments, tenant data 120 for each tenant may be stored in a logical store across one or more tenant datastores 114. In some embodiments, each tenant uses a logical store that is not assigned to any predetermined tenant datastores 114. Each logical store may contain tenant data 120 that is used, generated and/or stored as part of providing tenant-specific business services or functions. In some embodiments, the tenant datastores 114 may include relational database management systems (RDBMS), object-based database systems, and/or the like. In some embodiments, tenant data 120 may be stored across multiple tenant datastores 114, with each datastore dedicated to a particular service (e.g., managing customer records, managing product and/or service consumption information, managing billing information, managing payment information, and/or the like).

In some embodiments, the tenant data 120 may include subscription information, such as billing data and/or subscription status (e.g., active, canceled, suspended, re-activated). In some embodiments, the tenant data 120 does not include behavioral data. Behavioral data may include user interaction data, such as when a user logs into a service, uses a service, and/or the like. Billing data may include billing invoice data (e.g., date of invoices and invoice amounts, overage charge dates and overage charge amounts), payment transaction data (e.g., date of payments, amount of payments), payment methods (e.g., credit card, debit card), payment plan (e.g., annual billing, monthly billing), and/or service plan information (e.g., the name of a service plan). Subscription information may also include a geographic region and/or location associated with a tenant, service, and/or subscriber.

In some embodiments, subscription information includes non-behavioral account activity (or, simply, account activity), such as new subscriptions, changes to subscribed products and/or services, cancellation of one or more products and/or services, subscriptions to new products and/or services, application of discounts, loyalty program package changes (e.g., additional programs and/or services, special rates, and/or the like for loyal customers), reduction or increase of rates for products and/or services, and/or cancellation of the application. In some embodiments, account activity does not include usage of a product and/or product of a subscriber (e.g., what channels the subscriber actually watches, what services and what level of consumption the subscriber receives, quality of the product and/or services, and/or like subscriber behavioral data).

In some embodiments, the tenant data 120 may be stored in one or more data formats that are native to the multi-tenant system 102, as defined by one or more data format rules 120. The data format rules 120 may be stored in the system datastore 116, and may define one or more data formats that are native to the multi-tenant system and/or one or more data formats that may be used by multiple tenants of the multi-tenant system 102 (e.g., each tenant of the multi-tenant system 102). For example, the data format rules 120 may define data types, programming languages, scripting languages, data value parameters (e.g., date formats, string lengths), and/or the like, that are native to the multi-tenant system 102. Some or all of the data format rules 120 may be applied consistently across to the tenants of the multi-tenant system 102. Accordingly, the tenant data 120 may be independent of third-party data formats, and/or may not be based on an integration of third-party data.

The churn prediction engine 118 may function to predict churn with respect to tenants and/or products or services of those tenants. For example, the churn prediction engine 118 may predict whether a subscriber of a prover's service is at risk for canceling their subscription to that service, cancelling an account with the provider, and/or the like. The churn prediction engine 118 can predict churn without using behavioral data. For example, the churn prediction engine 118 may identify primary features (or, metrics) from the tenant data 120, such as the date of a last payment (e.g., Jun. 5, 2018), and then derive secondary features (or, metrics) based on the primary features. For example, the secondary features may include a length of time since the last payment was received (e.g., three months) based on a current date (e.g., Sep. 5, 2018) and the date that the last payment was received (e.g., Jun. 5, 2018). The churn prediction engine 118 may generate a churn prediction model using the primary and secondary features. The churn prediction engine 118 may use the churn prediction model with current billing data to predict churn for current subscribers. Since the tenant data 120 is stored in a native data format that is common across tenants of the multi-tenant system 102, the same churn prediction engine 118 may be used to generate churn prediction models and predict churn for the different tenants without requiring lengthy and/or computationally intensive development and/or customization of datasets, models, and/or the like.

The data network (or, communication network) 104 may represent one or more computer networks (e.g., LAN, WAN, or the like) or other transmission mediums. The data network 104 may provide communication between the systems, engines, datastores, and/or devices described herein. In some embodiments, the data network 104 includes one or more computing devices, routers, cables, buses, and/or other network topologies (e.g., mesh, and the like). In some embodiments, the data network 104 may be wired and/or wireless. In various embodiments, the data network 104 may include the Internet, one or more wide area networks (WANs) or local area networks (LANs), one or more networks that may be public, private, IP-based, non-IP based, and so forth.

Figure 2:
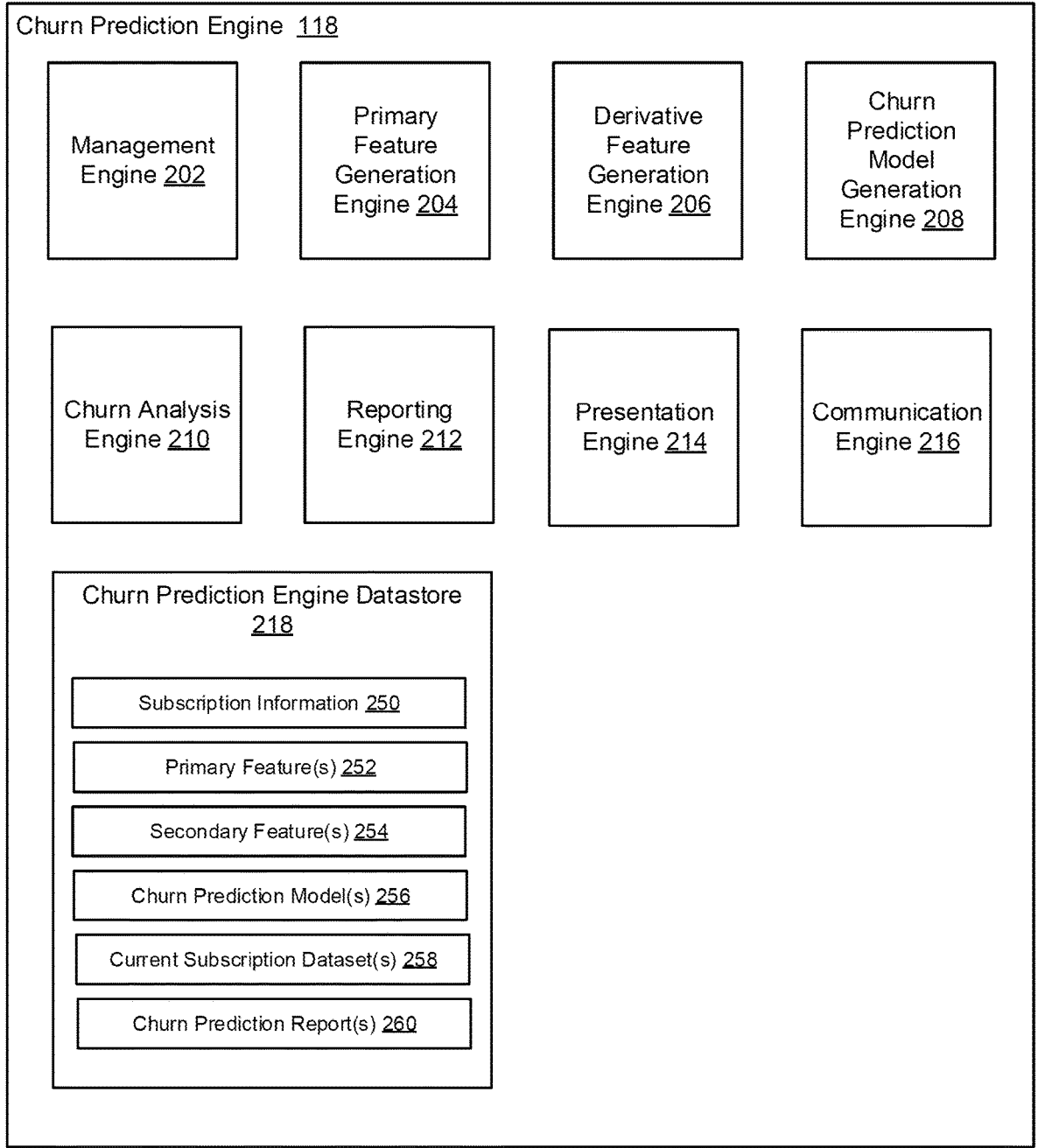
FIG. 2 depicts a diagram of an example churn prediction engine according to some embodiments.

FIG. 2 depicts a diagram of an example churn prediction engine 118 according to some embodiments. In the example of FIG. 2, the churn prediction engine 118 includes a management engine 202, a primary feature generation engine 204, a derivative feature generation engine 206, a churn prediction model generation engine 208, a churn analysis engine 210, a reporting engine 212, a presentation engine 214, a communication engine 216, and a churn prediction engine datastore 218.

The management engine 202 may function to manage (e.g., create, read, update, delete, or otherwise access) subscription information 250, primary features 252, secondary features 254, churn prediction models 256, current subscription datasets 258, and/or churn prediction results 260. Any of 250-260 may be stored in the churn prediction engine datastore 218 and/or other datastore(s) associated with the churn prediction engine 118. The management engine 202 may perform any of these operations manually (e.g., by a user interacting with a GUI) and/or automatically (e.g., triggered by one or more of the engines 204-212). Like other engines described herein, some or all of the functionality of the management engine 202 may be included in and/or cooperate with one or more other engines (e.g., engines 204-216).

The primary feature generation engine 204 may function to determine and/or generate primary features 252. For example, the primary feature generation engine 204 may generate primary features 252 from subscription information 250. Primary features may include billing invoice data (e.g., date of invoices and invoice amounts, overage charge dates and overage charge amounts), payment transaction data (e.g., date of payments, amount of payments), payment methods (e.g., credit card, debit card), payment plan (e.g., annual billing, monthly billing), service plan information (e.g., the name of a service plan), and/or account or subscription status (e.g., active, canceled). Primary features may also include a geographic region and/or location associated with a tenant, service, and/or subscriber.

In some embodiments, the primary feature generation engine 204 functions to identify primary features 252 (e.g., plan information) based on a keyword analysis (e.g., as opposed to a unique identifier analysis). For example, plans may have overlapping information and/or different variants of the plan, and each may have a different unique identifier. In order to capture all of the relevant plans, the primary feature generation engine 204 may search the plans for one or more keywords (e.g., "internet service") and/or may create features based on measures and/or statistics of the keywords. This may, for example, result in better churn prediction accuracy than using the particular plan identifier which may not have as clear a relationship with churn.

The derivative feature generation engine 206 may function to derive secondary features 254 from one or more primary features 252. Secondary features 254 may include a length of time since a last payment was received (e.g., three months) based on a current date (e.g., Sep. 5, 2018) and a date that the last payment was received (e.g., Jun. 5, 2018). Other secondary features may include the total amount paid by a subscriber within a period of time (e.g., the last 90 days), the total amount of overage charges incurred within a period of time (e.g., the last 90 days), how much times has passed since the last overage charge was incurred (e.g., 120 days), and/or the like.

In some embodiments, the secondary features 254 include measures and/or statistics of subscription billing amounts (e.g., payments, charges, overages, usage fees, and/or the like). In some embodiments, the secondary features 254 include measures and/or statistics of subscription history (e.g., length of time as a subscriber, pervious cancellations on the system, and/or the like). In some embodiments, the secondary features 254 include features derived from the use by subscribers of products from different tenants on the multi-tenants system 102. For example, the derivative feature generation engine 206 may use data relating to an attribute or set of attributes indicating that a subscriber(s) uses products from a first tenant (e.g., Verizon) and a second tenant (e.g., AT&T) to predict churn on a product of a third tenant (e.g., Sprint).

In some embodiments, the derivative feature generation engine 206 functions to identify secondary features 254 (e.g., plan information) based on a keyword analysis (e.g., as opposed to a unique identifier analysis). For example, plans may have overlapping information and/or different variants of the plan, and each may have a different unique identifier. In order to capture all of the relevant plans, the derivative feature generation engine 206 may search the plans for one or more keywords (e.g., "internet service") and/or may create features based on measures and/or statistics of the keywords. This may, for example, result in better churn prediction accuracy than using the particular plan identifier which may not have as clear a relationship with churn.

The churn prediction model generation engine 208 may function to generate churn prediction models 256. For example, the churn prediction model 208 may generate churn prediction models 256 using primary features 252, secondary features 254, and/or subscription information 250. The churn prediction models 256 may implement one or more machine learning techniques, such as regression analysis, bootstrap regression analysis, principle component analysis, and/or the like. In some embodiments, the churn prediction model generation engine 208 may function to validate and/or test a churn prediction model 256 using other datasets (e.g., validations datasets, test datasets). For example, the datasets described herein may include labeled data indicating whether data is an example resulting in churn (e.g., positive example), or whether the data is an example that did not result in churn (e.g., negative example). In various embodiments, the churn prediction model 256 described herein may be trained, validated, and/or tested using datasets (e.g., subsets of tenant data 120 and/or subscription information 250) of limited size (e.g., 100 examples of churn).

In some embodiments, the churn prediction model generation engine 208 functions to generate churn prediction models 256 based on a shared churn prediction model. For example, a shared churn prediction model may be used by multiple tenants (e.g., AT&T and Verizon) and customized for each particular tenant (e.g., using their respective data) to generate their respective churn prediction models 256. This may, for example, reduce an amount of time required for the churn prediction engine 118 to train, validate, test, and/or deploy a churn prediction model 256.

In some embodiments, the churn prediction model generation engine 208 functions to generate churn prediction models 256 for tenants with no tenant data 120 and/or minimal tenant data 120. For example, a tenant may be new to the multi-tenant system 102, and may not have acquired a threshold number of examples of churn (e.g., 100 examples) to accurately predict churn. In some embodiments, the churn prediction model generation engine 208 may generate and/or leverage other datasets, such as anonymized datasets based on the tenant data 120 of one or more similar tenants, plans, and/or the like, to generate churn prediction models 256. In some embodiments, template datasets may be used. For example, template datasets may represent typical providers (e.g., internet providers). These other datasets may be used to generate churn prediction models 256 until the tenant has acquired a threshold number of examples of churn and/or other required amount of information. For example, the new tenant may use the other datasets for three-months, and then transition to their own data.

In some embodiments, the other datasets may be blended with their tenant data 120. For example, at one or more threshold levels of examples of churn (e.g., 30 examples, 50 example, 80 examples), the churn prediction model generation engine 208 may reduce the amount of data used from the other datasets, and increase the amount of their own tenant data 120 used to generate the churn prediction model 256. Like the churn prediction model generation engine 208, the primary feature generation engine 204 and/or the derivative feature generation engine 206 may generate features based on the other datasets if the tenant has not acquired sufficient tenant data 120.

The churn analysis engine 210 may function to predict churn in the multi-tenant system 102. The churn analysis engine 210 may identify one or more subscribers and/or plans that are considered to be a churn-risk using a churn prediction model 256 and a current subscription dataset 258 as input values for the churn prediction model 256. In some embodiments, a churn-risk may be a subscriber that has a likelihood of churn that exceeds a threshold. For example, if a subscriber has greater than an 50% likelihood of churn, then the churn analysis engine 210 may indicate the subscriber as a churn-risk. The current subscription dataset 258 may be a subset of the tenant data 120, and may include more recent data than the tenant data 120 used to generate the churn prediction model 256. For example, a first subset of the tenant data 120 may be used to generate the features 252 and 254, and a second subset of the tenant data 120 may be used to predict churn in the multi-tenant system 102.

The reporting engine 212 may function to generate reports 260 indicating churn prediction results. For example, the reporting engine 212 may generate reports 260 indicating subscribers and/or plans that are predicted to be a churn risk by the churn analysis engine 210, the likelihood that the particular subscribers will churn, and/or the like. Reports may include subscriber information, plan information, and/or the like. The reporting engine 212 may configure the reports 212 for presentation in a graphical user interface.

The presentation engine 214 may function to generate, present and/or display one or more dashboards and/or graphical user interfaces. For example, a dashboard may allow a user (e.g., a tenant administrator) to view reports 260, request a churn prediction and/or reports 260, view tenant data 120, and/or the like. The presentation engine 214 may cooperate with one or more other systems to provide such interfaces. For example, the presentation engine 214 may generate server-side portions of the interfaces, and client systems 108 may generate client-side portions of the interfaces.

In some embodiments, the presentation engine 214 functions to present interfaces allowing users (e.g., tenant administrators) to interact with one or more of the other engines of the churn prediction engine 118. In some embodiments, the presentation engine 214 functions to present interfaces allowing users to perform remedial actions in response to churn prediction results. For example, a report 260 may indicate John Smith is a churn-risk, at which point the user may offer John Smith incentives, discounts, and/or the like, in order to reduce a likelihood that John Smith cancels his subscription and/or otherwise churns. In another example, a report 260 may indicate that a particular plan is associated with high subscriber churn (e.g., greater than a threshold amount). A user may modify that plan, and/or suggest other plans, in order to reduce the amount of churn associated with that particular plan.

The communication engine 218 may function to send requests, transmit and, receive communications, and/or otherwise provide communication with one or a plurality of the systems, engines, and/or datastores described herein. In some embodiments, the communication engine 218 functions to encrypt and decrypt communications. The communication engine 218 may function to send requests to and receive data from one or more systems through a network or a portion of a network. Depending upon implementation-specific considerations, the communication engine 218 may send requests and receive data through a connection, all or a portion of which may be a wireless connection. The communication engine 218 may request and receive messages, and/or other communications from associated systems and/or engines. Communications may be stored in the churn prediction engine datastore 218.

FIGS. 3A-B depict a flowchart of an example of a method 300 of predicting churn in a multi-tenant system according to some embodiments. In this and other flowcharts and/or sequence diagrams, the flowchart illustrates by way of example a sequence of steps. It should be understood the steps may be reorganized for parallel execution, or reordered, as applicable. Moreover, some steps that could have been included may have been removed to avoid providing too much information for the sake of clarity and some steps that were included could be removed, but may have been included for the sake of illustrative clarity.

In step 302, a multi-tenant system (e.g., multi-tenant system 102) stores a respective subscription dataset (e.g., tenant data 120 and/or subscription information 250) for each tenant of the multi-tenant system. Each of the respective subscription datasets may have one or more common data formats (e.g., as defined by data format rules 122) native to the multi-tenant system. The respective subscription datasets include billing data without including behavioral data. In some embodiments, the multi-tenant system stores the respective subscription datasets in a datastore (e.g., tenant datastore 114 and/or churn prediction engine datastore 218).

In some embodiments, the one or more common data formats native to the multi-tenant system are independent of third-party data formats, and/or are not based on an integration of third-party data. In some embodiments, the particular respective subscription dataset of the particular tenant of the multi-tenant system includes a limited number of examples of churn.

In step 304, the multi-tenant system determines, by a churn prediction engine (e.g., churn prediction engine 118) of the multi-tenant system, one or more primary features (e.g., primary features 252) from a particular respective subscription dataset of a particular tenant (e.g., AT&T) of the multi-tenant system. For example, the one or more primary features include date of last payment and a subscription status (e.g., active, canceled). In some embodiments, a primary feature generation engine (e.g., primary feature generation engine 204) determines the one or more primary features.

In step 306, the multi-tenant system derives, by the churn prediction engine of the multi-tenant system, one or more secondary features (e.g., secondary features 254) from the one or more primary features. For example, the one or more second features include length of time since the date of last payment. In some embodiments, a derivative feature generation engine (e.g., derivative feature generation engine 206) determines the one or more secondary features.

In step 308, the multi-tenant system generates, by the churn prediction engine of the multi-tenant system, a particular churn prediction model (e.g., a churn prediction model 256) based on the one or more primary features and the one or more secondary features. The particular churn prediction model may be based on a shared churn prediction model. For example, a shared churn prediction model may be used by multiple tenants (e.g., AT&T and Verizon) and customized for each particular tenant (e.g., using their respective data). In some embodiments, a churn prediction model generation engine (e.g., churn prediction model generation engine 208) generates the particular churn prediction model.

In step 310, the multi-tenant system obtains, by the churn prediction engine of the multi-tenant system, a second subscription dataset (e.g., current subscription dataset 258) of the particular tenant of the multi-tenant system. The second subscription dataset may comprise billing data that is more recent than the particular respective subscription dataset of the particular tenant of the multi-tenant system. In some embodiments, a management engine (e.g., management engine 202) obtains the second subscription dataset from a datastore (e.g., churn prediction engine datastore 218).

In step 312, the multi-tenant system identifies, by the churn prediction engine of the multi-tenant system using the particular churn prediction model and the second subscription dataset of the particular tenant of the multi-tenant system, one or more subscribers of the particular tenant of the multi-tenant system as a churn-risk. For example, the second subscription dataset may be used as input for the churn prediction model. In some embodiments, a churn analysis engine (e.g., churn analysis engine 210) identifies the one or more subscribers as a churn-risk.

In step 314, the multi-tenant system reports the one or more subscribers of the particular tenant of the multi-tenant system identified as a churn-risk. In some embodiments, a reporting engine (e.g., reporting engine 212) may generate a report (e.g., churn prediction report 260) indicating the identified one or more subscribers. In some embodiments, a presentation engine (e.g., presentation engine 214) may generate one or more graphical user interfaces, and/or portions thereof (e.g., server-side portions), for graphically presenting the report.

In step 316, the multi-tenant system determines, by the churn prediction engine of the multi-tenant system, one or more different primary features (e.g., different primary features 252) from a different respective subscription dataset (e.g., different tenant data 120 and/or different subscription information 250) of a different tenant (e.g., Verizon) of the multi-tenant system. As used here, the different primary features may be "different" from the primary features determined in step 304, and the different respective subscription dataset may be "different" from the particular respective subscription dataset recited in the step 304. In some embodiments, the primary feature generation engine determines the one or more different primary features.

In step 318, the multi-tenant system derives, by the churn prediction engine of the multi-tenant system, one or more different secondary features (e.g., different secondary features 254) from the one or more different primary features. As used here, the different secondary features may be "different" from the secondary features derived in step 306. In some embodiments, the derivative feature generation engine derives the one or more different secondary features.

In step 320, the multi-tenant system generates, by the churn prediction engine of the multi-tenant system, a different churn prediction model (e.g., a different churn prediction model 256) based on the one or more different primary features and the one or more different secondary features. As used here, the different churn prediction model may be "different" from the churn prediction model generated in step 308. In some embodiments, the churn prediction model generation engine generates the different churn prediction model.

In step 322, the multi-tenant system obtains, by the churn prediction engine of the multi-tenant system, a third subscription dataset (e.g., another current subscription dataset 258) of the different tenant of the multi-tenant system. The third subscription dataset may comprise billing data that is more recent than the different respective subscription dataset of the different tenant of the multi-tenant system. In some embodiments, the management engine obtains the third subscription dataset from the datastore.

In step 324, the multi-tenant system identifies, by the churn prediction engine of the multi-tenant system using the different churn prediction model and the third subscription dataset of the different tenant of the multi-tenant system, one or more different subscribers of the different tenant of the multi-tenant system as a churn-risk. For example, the third subscription dataset may be used as input for the different churn prediction model. As used here, the different subscribers may be "different" from the subscribers identified in step 312. In some embodiments, the churn analysis engine identifies the one or more different subscribers of the different tenant of the multi-tenant system as a churn-risk In step 326, the multi-tenant system reports the one or more different subscribers of the different tenant of the multi-tenant system identified as a churn-risk. In some embodiments, the reporting engine may generate another report (e.g., another churn prediction report 260) indicating the identified one or more different subscribers. In some embodiments, the presentation engine (may generate one or more graphical user interfaces, and/or portions thereof (e.g., server-side portions), for graphically presenting the report.

In some embodiments, the churn prediction engine is configured to operate on the one or more common data formats native to the multi-tenant system, thereby allowing the churn prediction engine to use the same machine learning algorithm for the particular churn prediction model and the different churn prediction model. In some embodiments, the machine learning algorithm comprises a regression analysis.

FIG. 4 depicts a diagram 400 of an example of a computing device 402. Any of the systems, engines, datastores, and/or networks described herein may comprise an instance of one or more computing devices 402. In some embodiments, functionality of the computing device 402 is improved to the perform some or all of the functionality described herein. The computing device 402 comprises a processor 404, memory 406, storage 408, an input device 410, a communication network interface 412, and an output device 414 communicatively coupled to a communication channel 416. The processor 404 is configured to execute executable instructions (e.g., programs). In some embodiments, the processor 404 comprises circuitry or any processor capable of processing the executable instructions.

The memory 406 stores data. Some examples of memory 406 include storage devices, such as RAM, ROM, RAM cache, virtual memory, and/or the like. In various embodiments, working data is stored within the memory 406. The data within the memory 406 may be cleared or ultimately transferred to the storage 408.

The storage 408 includes any storage configured to retrieve and store data. Some examples of the storage 408 include flash drives, hard drives, optical drives, cloud storage, and/or magnetic tape. Each of the memory system 406 and the storage system 408 comprises a computer-readable medium, which stores instructions or programs executable by processor 404.

The input device 410 is any device that inputs data (e.g., mouse and keyboard). The output device 414 outputs data (e.g., a speaker or display). It will be appreciated that the storage 408, input device 410, and output device 414 may be optional. For example, the routers/switchers may comprise the processor 404 and memory 406 as well as a device to receive and output data (e.g., the communication network interface 412 and/or the output device 414).

The communication network interface 412 may be coupled to a network (e.g., network 108) via the link 418. The communication network interface 412 may support communication over an Ethernet connection, a serial connection, a parallel connection, and/or an ATA connection. The communication network interface 412 may also support wireless communication (e.g., 802.11 a/b/g/n, WiMax, LTE, WiFi). It will be apparent that the communication network interface 412 may support many wired and wireless standards.

It will be appreciated that the hardware elements of the computing device 402 are not limited to those depicted in FIG. 4. A computing device 402 may comprise more or less hardware, software and/or firmware components than those depicted (e.g., drivers, operating systems, touch screens, biometric analyzers, and/or the like). Further, hardware elements may share functionality and still be within various embodiments described herein. In one example, encoding and/or decoding may be performed by the processor 404 and/or a co-processor located on a GPU (i.e., NVidia).

It will be appreciated that an "engine," "system," "datastore," and/or "database" may comprise software, hardware, firmware, and/or circuitry. In one example, one or more software programs comprising instructions capable of being executable by a processor may perform one or more of the functions of the engines, datastores, databases, or systems described herein. In another example, circuitry may perform the same or similar functions. Alternative embodiments may comprise more, less, or functionally equivalent engines, systems, datastores, or databases, and still be within the scope of present embodiments. For example, the functionality of the various systems, engines, datastores, and/or databases may be combined or divided differently. The datastore or database may include cloud storage. It will further be appreciated that the term "or," as used herein, may be construed in either an inclusive or exclusive sense. Moreover, plural instances may be provided for resources, operations, or structures described herein as a single instance.

The datastores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

The systems, methods, engines, datastores, and/or databases described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The present invention(s) are described above with reference to example embodiments. It will be apparent to those skilled in the art that various modifications may be made and other embodiments may be used without departing from the broader scope of the present invention(s). Therefore, these and other variations upon the example embodiments are intended to be covered by the present invention(s).

The invention claimed is:

1. A multi-tenant system comprising:
one or more processors;
a plurality of tenant interfaces configured to support load balancing when multiple tenants of the multi-tenant system access the multi-tenant system concurrently, each tenant of the multiple tenants being associated with a subset of the plurality of tenant interfaces for load balancing; and
memory storing instructions that, when executed by the one or more processors, cause the multi-tenant system to perform:
storing a respective subscription dataset for the each tenant of the multiple tenants of the multi-tenant system, each respective subscription dataset having one or more common data formats native to the multi-tenant system, each respective subscription dataset including first billing data of a first subset of subscribers of multiple subscribers of the tenant and not including product or service usage data of the first subset of the subscribers of the multiple subscribers of the tenant;
obtaining, by a churn prediction engine, the respective subscription dataset for a particular tenant;
determining, by the churn prediction engine, one or more primary features from the particular respective subscription dataset of the particular tenant of the multi-tenant system;
deriving, by the churn prediction engine, one or more secondary features from the one or more primary features;
generating, by the churn prediction engine, a particular churn prediction model for the particular tenant based on the one or more primary features and the one or more secondary features, the churn prediction engine using a same machine learning algorithm capable of operating on the one or more common data formats native to the multi-tenant system so that the same machine learning algorithm can generate different churn prediction models for different tenants of the multi-tenant system;
obtaining, by the churn prediction engine, a second subscription dataset of the particular tenant of the multi-tenant system, the second subscription dataset comprising second billing data of a second subset of the subscribers of the particular tenant of the multi-tenant system that is more recent than the respective subscription dataset of the particular tenant of the multi-tenant system and not comprising product or service usage data of the second subset of the subscribers of the particular tenant;

identifying, by the churn prediction engine using the particular churn prediction model and the second subscription dataset of the particular tenant of the multi-tenant system, one or more particular subscribers of the second subset of the subscribers of the particular tenant of the multi-tenant system as a churn-risk; and
reporting the one or more particular subscribers of the particular tenant of the multi-tenant system identified as a churn-risk using at least one of the subset of the plurality of tenant interfaces associated with the particular tenant.

2. The multi-tenant system of claim 1, wherein the instructions further cause the multi-tenant system to perform:
determining, by the churn prediction engine, one or more different primary features from a different respective subscription dataset of a different tenant of the multi-tenant system;
deriving, by the churn prediction engine, one or more different secondary features from the one or more different primary features;
generating, by the churn prediction engine, a different churn prediction model based on the one or more different primary features and the one or more different secondary features;
obtaining, by the churn prediction engine, a third subscription dataset of the different tenant of the multi-tenant system, the third subscription dataset comprising billing data that is more recent than the different respective subscription dataset of the different tenant of the multi-tenant system;
identifying, by the churn prediction engine using the different churn prediction model and the third subscription dataset of the different tenant of the multi-tenant system, one or more different subscribers of the different tenant of the multi-tenant system as a churn-risk; and
reporting the one or more different subscribers of the different tenant of the multi-tenant system identified as a churn-risk.

3. The multi-tenant system of claim 2, wherein the one or more common data formats native to the multi-tenant system are independent of third-party data formats, and are not based on an integration of third-party data.

4. The multi-tenant system of claim 2, wherein the churn prediction engine is configured to use the same machine learning algorithm for the particular churn prediction model and the different churn prediction model.

5. The multi-tenant system of claim 4, wherein the same machine learning algorithm comprises a regression analysis.

6. The multi-tenant system of claim 1, wherein the one or more primary features include date of last payment and subscription status.

7. The multi-tenant system of claim 6, wherein the one or more secondary features include length of time since the date of last payment.

8. The multi-tenant system of claim 6, wherein the one or more secondary features include any of measures and statistics of plan information keywords.

9. The multi-tenant system of claim 6, wherein the one or more secondary features include any of measures and statistics of subscription billing amounts.

10. The multi-tenant system of claim 6, wherein the one or more secondary features include any of measures and statistics of subscription history.

11. The multi-tenant system of claim 6, wherein the one or more secondary features include any of features derived from use by subscribers of products from different tenants on the multi-tenant system.

12. The multi-tenant system of claim 1, wherein the respective subscription dataset of the particular tenant of the multi-tenant system includes a limited number of examples of churn.

13. A method being implemented by a computing system including one or more physical processors, storage media storing machine-readable instructions, and a plurality of tenant interfaces configured to support load balancing when multiple tenants of a multi-tenant system access the multi-tenant system concurrently, each tenant of the multiple tenants being associated with a subset of the plurality of tenant interfaces for load balancing, the method comprising:

storing a respective subscription dataset for the each tenant of the multiple tenants of the multi-tenant system, each respective subscription dataset having one or more common data formats native to the multi-tenant system, each respective subscription dataset including first billing data of a first subset of subscribers of multiple subscribers of the tenant and not including product or service usage data of the first subset of the subscribers of the multiple subscribers of the tenant;

obtaining, by a churn prediction engine, the respective subscription dataset for a particular tenant;

determining, by the churn prediction engine, one or more primary features from the particular respective subscription dataset of the particular tenant of the multi-tenant system;

deriving, by the churn prediction engine, one or more secondary features from the one or more primary features;

generating, by the churn prediction engine, a particular churn prediction model for the particular tenant based on the one or more primary features and the one or more secondary features, the churn prediction engine using a same machine learning algorithm capable of operating on the one or more common data formats native to the multi-tenant system so that the same machine learning algorithm can generate different churn prediction models for different tenants of the multi-tenant system;

obtaining, by the churn prediction engine, a second subscription dataset of the particular tenant of the multi-tenant system, the second subscription dataset comprising second billing data of a second subset of the subscribers of the particular tenant of the multi-tenant system that is more recent than the respective subscription dataset of the particular tenant of the multi-tenant system and not comprising product or service usage data of the second subset of the subscribers of the particular tenant;

identifying, by the churn prediction engine using the particular churn prediction model and the second subscription dataset of the particular tenant of the multi-tenant system, one or more particular subscribers of the second subset of the subscribers of the particular tenant of the multi-tenant system as a churn-risk; and reporting the one or more particular subscribers of the particular tenant of the multi-tenant system identified as a churn-risk using at least one of the subset of the plurality of tenant interfaces associated with the particular tenant.

14. The method of claim 13, further comprising:

determining, by the churn prediction engine, one or more different primary features from a different respective subscription dataset of a different tenant of the multi-tenant system;

deriving, by the churn prediction engine, one or more different secondary features from the one or more different primary features;

generating, by the churn prediction engine, a different churn prediction model based on the one or more different primary features and the one or more different secondary features;

obtaining, by the churn prediction engine, a third subscription dataset of the different tenant of the multi-tenant system, the third subscription dataset comprising billing data that is more recent than the different respective subscription dataset of the different tenant of the multi-tenant system;

identifying, by the churn prediction engine using the different churn prediction model and the third subscription dataset of the different tenant of the multi-tenant system, one or more different subscribers of the different tenant of the multi-tenant system as a churn-risk; and reporting the one or more different subscribers of the different tenant of the multi-tenant system identified as a churn-risk.

15. The method of claim 14, wherein the one or more common data formats native to the multi-tenant system are independent of third-party data formats, and are not based on an integration of third-party data.

16. The method of claim 14, wherein the churn prediction engine is configured to use the same machine learning algorithm for the particular churn prediction model and the different churn prediction model.

17. The method of claim 16, wherein the same machine learning algorithm comprises a regression analysis.

18. The method of claim 13, wherein the one or more primary features include date of last payment and subscription status.

19. The method of claim 18, wherein the one or more secondary features include length of time since the date of last payment.

20. A non-transitory computer readable medium comprising computer readable instructions configured to, when executed, cause one or more physical processors to perform:

providing a plurality of tenant interfaces configured to support load balancing when multiple tenants of a multi-tenant system access the multi-tenant system concurrently, each tenant of the multiple tenants being associated with a subset of the plurality of tenant interfaces for load balancing;

storing a respective subscription dataset for the each tenant of the multiple tenants of the multi-tenant system, each respective subscription dataset having one or more common data formats native to the multi-tenant system, each respective subscription dataset including first billing data of a first subset of subscribers of multiple subscribers of the tenant and not including product or service usage data of the first subset of the subscribers of the multiple subscribers of the tenant;

obtaining, by a churn prediction engine, the respective subscription dataset for a particular tenant;

determining, by the churn prediction engine, one or more primary features from the particular respective subscription dataset of the particular tenant of the multi-tenant system;

deriving, by the churn prediction engine, one or more secondary features from the one or more primary features;

generating, by the churn prediction engine, a particular churn prediction model for the particular tenant based on the one or more primary features and the one or more secondary features, the churn prediction engine using a same machine learning algorithm capable of operating on the one or more common data formats native to the multi-tenant system so that the same machine learning algorithm can generate different churn prediction models for different tenants of the multi-tenant system;

obtaining, by the churn prediction engine, a second subscription dataset of the particular tenant of the multi-tenant system, the second subscription dataset comprising second billing data of a second subset of the subscribers of the particular tenant of the multi-tenant system that is more recent than the respective subscription dataset of the particular tenant of the multi-tenant system and not comprising product or service usage data of the second subset of the subscribers of the particular tenant;

identifying, by the churn prediction engine using the particular churn prediction model and the second subscription dataset of the particular tenant of the multi-tenant system, one or more particular subscribers of the second subset of the subscribers of the particular tenant of the multi-tenant system as a churn-risk; and reporting the one or more particular subscribers of the particular tenant of the multi-tenant system identified as a churn-risk using at least one of the subset of the plurality of tenant interfaces associated with the particular tenant.

\* \* \* \* \*